Patented Apr. 19, 1927.

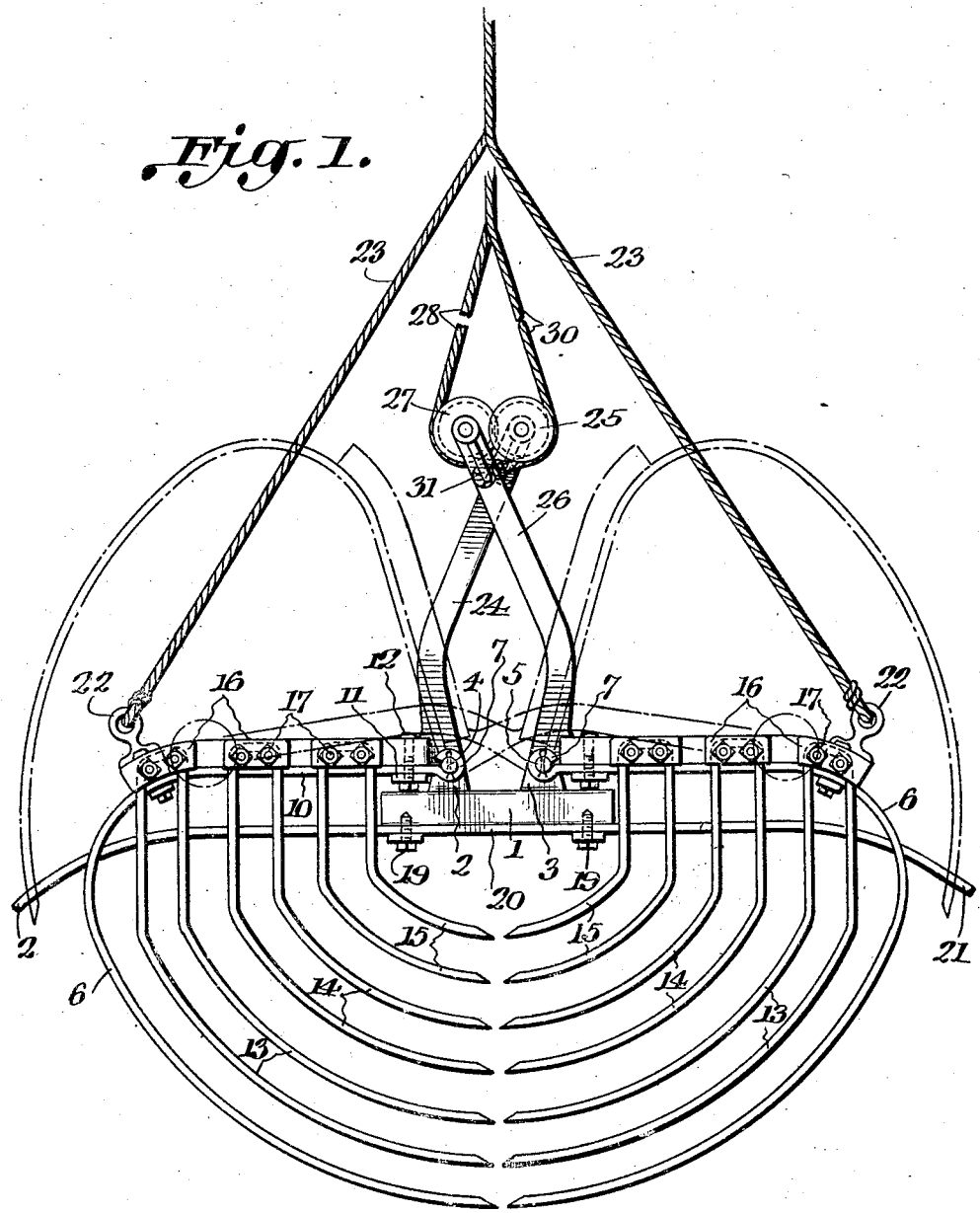

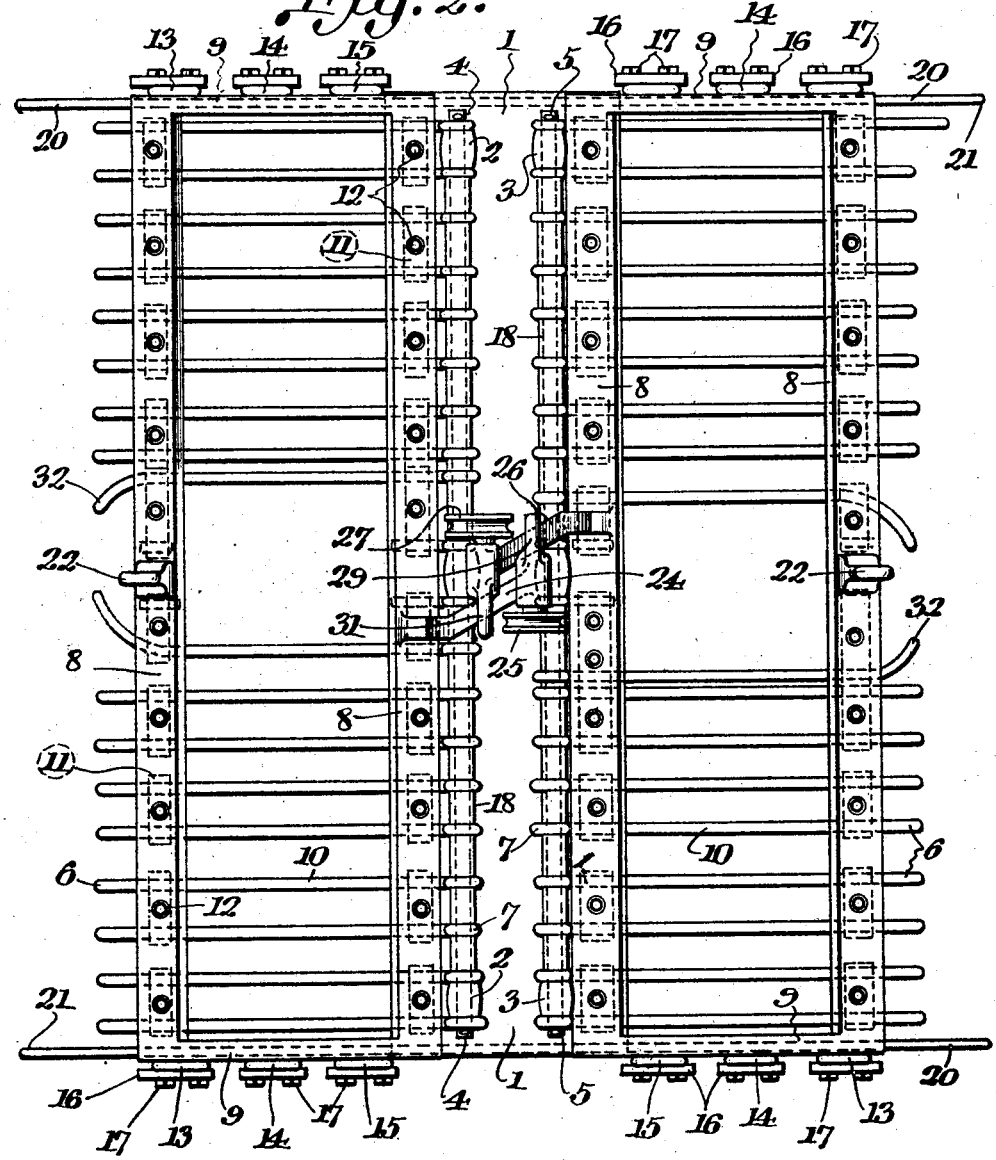

1,625,526

UNITED STATES PATENT OFFICE.

SCHUYLER DAVEY, OF STILLWATER, NEW YORK.

POWER FORK.

Application filed August 9, 1926. Serial No. 128,242.

The invention relates to an improved form intended to be operated by power from a suitable derrick or other source and to be utilized for the purpose of handling manure, hay and other similar more or less loose materials. The particular features of the invention will be apparent from the following description and the appended claims.

In the drawing:

Figure 1 is an end elevation of the device for a different position of certain parts indicated in dotted lines.

Figure 2 is a top plan view.

The device comprises a central frame member 1 provided at each end with a pair of ears 2 and 3. A rod 4 passes through the ears 2 and a similar rod 5 passes through the ears 3. Curved tines or fingers 6 of the form shown in the drawing have their inner ends provided with eyes 7 which embrace the rods 4 and 5 respectively. The tines are spaced on the rods by means of sleeves 18.

At each side of the central portion 1 of the device is an open rectangular frame and since both sides are similar in construction, only one will be referred to in the following description. Each frame comprises side members 8 connected by end members 9 and the frame may be made of one piece of material or in separate pieces rigidly fastened together. The tines 6 have a generally straight portion 10 extending some distance from the eyes 7 and these portions are fastened to the frame members 8 by means of metal strips or washers 11, each of which engages two adjacent tines and is fastened to the side 8 of the frame by a bolt 12. In this manner the tines 6 and frames will turn as units about the rods 4 and 5 respectively.

At each end there is attached to each of the longitudinal frames 8, pairs of tines 13, 14 and 15, each pair formed of a single piece of material and the tines decreasing in length inwardly as illustrated. The bend of each pair of tines is held to the ends 9 of the frame by means of metal strips or washers 16 fastened to the frame by bolts 17. These end tines are employed in order to substantially close the ends of the fork and prevent the escape of material when the fork is loaded and is being swung from one position to another.

At each end there is attached to the central part 1 by bolts 19 or similar fastenings a strip 20 which extends outwardly so that its ends 21 terminate outside of the tines 6. The purpose of this strip is to act as a cleaning or clearing device for the end tines when the fork is swung to the open dotted line position shown in Figure 1.

To the outer member 8 of each frame, near the center thereof, is attached in any desired manner an eye 22 to which is fastened one end of a cable 23. The two cables 23 are led to a common drum, not shown. The manner in which this drum is operated is immaterial for the purpose of the invention and it is therefore not shown. It is obvious that a pull on the cables 23 will move both frames with the supported tines about the axes of the rods 4 and 5 to the dotted line position of Figure 1 and therefore open the fork.

An arm 24 rises from the inner side member 8 of one frame, being attached thereto at a point slightly to one side of the center and at its upper end carries a pulley 25. A similar arm 26 rises from the inner member 8 of the other frame, being attached thereto at a point slightly on the opposite side of the center and terminates at its upper end in a pulley 27. The arms 24 and 26 are crossed so that the pulleys lie on the sides opposite to the point of attachment of the arms to their respective frames.

A cable 28 passes around the drum 27 and has its end attached to a projection 29 on the arm 24. A similar cable 30 passes around the pulley 25 and has its end attached to a projection 31 on the arm 26.

Assuming that the parts are in the full line position of Figure 1, in which position the fork is presumed to be loaded, and it is desired to empty the fork, the cables 28 and 30, which are wound upon a single drum, will slacken and a pull be exercised upon the cables 23. This will, as above stated, swing the frames and tines to the dotted line position of Figure 1. At the same time, the pulley 27 and arm 26 will swing toward the left, while the pulley 25 and arm 24 swings toward the right and these parts ultimately reach the dotted line position of Figure 1. The central tines are so spaced that these parts may move between adjacent tines in this movement. Assuming that the fork has now been emptied and returned to the place where another load is to be grasped, the fork will be lowered upon the material and the cables 23 will be slackened. Thereafter a pull will be exerted on the cables 28 and 30, raising the pulleys and arms from the dotted line position of Figure 1 to the full line position and thereby positively forcing the tines to grasp a load of material. As soon as the forks have been closed, continued pull on the cables 28 and 30 will lift the whole device, together with its load and it can then be swung to any desired position.

Since it is necessary to have the central tines somewhat more widely spaced it has been found desirable to curve inwardly the ends 32 of the two tines adjacent such space so that the outer ends of the tines are substantially evenly spaced.

It is obvious that the precise form and construction of the device may be varied and that it is immaterial what the exact source of power is so far as the invention is concerned. Minor changes in the proportions, materials and arrangement of parts are understood to fall within the spirit of the invention, which is to be regarded as limited only by the scope of the appended claims.

I claim as my invention:

1. A power fork comprising a central support, a pair of rectangular frames, a plurality of tines connected to each frame, means pivotally supporting said tines and frames from the central support, and means for positively moving the tines and frames to and from operative position, each of said moving means being operable to raise and lower said fork.

2. A power fork comprising a central support, a pair of rods supported thereby, a series of tines supported by each rod, a rectangular frame connected to each series of tines, the frames and tines being movable about the axis of the rods, and means connected to the frames for positively moving them and the tines to and from operative position, each of said moving means being operable to raise and lower said fork.

3. A power fork comprising a central support, a pair of rectangular frames, a series of tines connected to the sides of each frame, means for mounting the tines and frames on the central portion for movement toward and from each other, and a series of tines carried by each end of each frame and lying in planes parallel to the other tines.

4. A power fork comprising a central support, a pair of rectangular frames, a series of tines connected to the sides of each frame, means for mounting the tines and frames on the central portion for movement toward and from each other, and a series of tines carried by each end of each frame and lying in planes parallel to the other tines, the tines of each end series decreasing in length as the central support is approached.

5. A power fork comprising a central support, a pair of rectangular frames, a series of tines connected to the sides of each frame, means for mounting the tines and frames on the central portion for movement toward and from each other, and a series of tines carried by each end of each frame and lying in planes parallel to the other tines, the end tines being arranged in pairs, each pair made of one piece, and the length thereof decreasing as the central support is approached.

6. A power form comprising a central support, a pair of rectangular frames, a series of tines connected to the sides of each frame, means for mounting the tines and frames on the central portion for movement toward and from each other, a series of tines carried by each end of each frame and lying in planes parallel to the other tines, and means for clearing these tines of material when the fork is opened.

7. A power fork comprising a central support, a series of tines pivotally supported by each side of the support, a frame connected to each series of tines, an arm rising from the inner side of each frame and carrying a pulley at its free end, said arms crossing intermediate their ends, and an actuating cable passing around each pulley, each cable being attached at its end to the other arm, whereby pull on the cables will positively move the series of tines to operative position.

In testimony whereof, I have hereunto subscribed my name.

SCHUYLER DAVEY.